(12) United States Patent
Hirayama

(10) Patent No.: US 6,586,775 B2
(45) Date of Patent: Jul. 1, 2003

(54) LIGHT-EMITTING DEVICE AND A DISPLAY APPARATUS HAVING A LIGHT-EMITTING DEVICE

(75) Inventor: Yuzo Hirayama, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/531,490

(22) Filed: Mar. 20, 2000

(65) Prior Publication Data

US 2003/0071564 A1 Apr. 17, 2003

(30) Foreign Application Priority Data

Mar. 19, 1999 (JP) .............................. 11-075070

(51) Int. Cl.[7] .............................. H01L 29/15; H01J 61/38
(52) U.S. Cl. .............................. 257/98; 257/79; 257/103; 313/113
(58) Field of Search .............................. 257/13, 79, 82, 257/86, 918, 98; 313/522, 112–3, 461, 464; 392/376

(56) References Cited

U.S. PATENT DOCUMENTS

| | | | | |
|---|---|---|---|---|
| 4,689,519 A | * | 8/1987 | Ooms et al. | 313/112 |
| 5,079,473 A | | 1/1992 | Waymouth | |
| 5,440,421 A | * | 8/1995 | Fan et al. | 359/344 |
| 5,651,818 A | * | 7/1997 | Milstein et al. | 117/54 |
| 5,688,318 A | * | 11/1997 | Milstein et al. | 117/1 |
| 5,770,466 A | * | 6/1998 | Sasaki et al. | 437/89 |
| 5,784,400 A | | 7/1998 | Joannopoulos et al. | |
| 5,844,364 A | * | 12/1998 | Beardmore | 313/522 |
| 5,987,208 A | * | 11/1999 | Gruening et al. | 385/146 |
| 5,990,850 A | * | 11/1999 | Brown et al. | 343/912 |
| 5,998,298 A | * | 12/1999 | Fleming et al. | 438/692 |
| 5,999,308 A | * | 12/1999 | Nelson et al. | 359/321 |
| 6,011,580 A | * | 1/2000 | Hattori et al. | 348/57 |
| 6,058,127 A | * | 5/2000 | Joannopoulos et al. | 372/92 |
| 6,118,210 A | * | 9/2000 | Le Gars | 313/112 |
| 6,262,830 B1 | * | 7/2001 | Scalora | 359/248 |
| 6,326,981 B1 | * | 12/2001 | Mori et al. | 345/695 |

FOREIGN PATENT DOCUMENTS

| | | | | |
|---|---|---|---|---|
| JP | 407235691 A | * | 9/1995 | .......... H01L/33/00 |
| WO | WO-96/29621 | * | 9/1996 | |
| WO | WO-99/15922 | * | 4/1999 | |

* cited by examiner

Primary Examiner—Nathan J. Flynn
Assistant Examiner—Johannes P Mondt
(74) Attorney, Agent, or Firm—Oblon, Spivak, McClelland, Maier & Neustadt, P.C.

(57) ABSTRACT

A light emitting device which emits visible light through heat radiation of a tungsten filament. Photonic crystal structures in each of which Ag spheres are arranged in a $TiO_2$ film are provided around the filament. Whereas radiation of infrared light from the filament is suppressed, radiation of visible light is enhanced.

3 Claims, 13 Drawing Sheets

LIGHT-EMITTING DEVICE AND A DISPLAY APPARATUS HAVING A LIGHT-EMITTING DEVICE

BACKGROUND OF THE INVENTION

1. Field of the Invention

The present invention relates to a light-emitting device to be used for illumination, display, communication, etc., as well as to an illumination apparatus, a display apparatus, and other systems using such a light-emitting device. The present invention also relates to an optoelectronic integrated circuit device formed by integrating a silicon IC and optical elements.

2. Description of the Background Art

Various light-emitting devices are known. However, their luminous efficiency is low, which is a major problem to be solved. Recently, low-power-consumption light sources have been required in connection with environmentally related problems and various technical developments have been made to increase their luminous efficiency. For example, in incandescent lamps, heat-radiation light is mostly infrared light and includes very little visible light, which is the main reason of low efficiency. To increase the efficiency, a measure as shown in FIG. 18 has been taken in which the glass ball of a lamp is coated with an infrared reflection film referred to as a heat mirror (see Jack Brett et al., "Radiation-conserving Incandescent Lamps", J. of IES, p. 197, 1980). In FIG. 18, reference numeral 1801 denotes a glass ball having a heat mirror and numeral 1802 denotes a tungsten filament.

To increase the feedback ratio, that is, the ratio at which reflected infrared light is absorbed by the filament, fine adjustment of the filament position and other adjustments are necessary. However, the increase in feedback ratio attained by such adjustments is restricted, and hence sufficient improvement cannot be obtained.

A more straightforward measure in which the radiation itself of infrared light from a filament is suppressed has been proposed in U.S. Pat. No. 5,079,473. In this method, as shown in FIGS. 19A and 19B, an array of cavity waveguides is provided on the surface of a light-emitting body. In FIGS. 19A and 19B, reference numeral 1901 denotes a tungsten filament and numeral 1902 denotes cavities in this method, and the radiation of light in a frequency range that is lower than the cutoff frequency is suppressed by setting the cutoff frequency of the cavity waveguides at a predetermined value.

However, even in this case, infrared light is freely radiated from the regions between adjacent of the cavity waveguides. Decreasing the distance between adjacent cavity waveguides is considered to decrease the area of those regions to thereby reduce infrared radiation. However, this measure has a problem that the cutoff frequency disappears due to coupling of adjacent optical modes, that is, infrared light comes to be radiated freely contrary to the intention.

On the other hand, a display utilizing heat radiation has been reported (see Frederick Hochberg et al., "A Thin-film Integrated Incandescent Display," IEEE Trans. on Electron. Devices, Vol. ED-20, No. 11, p. 1,002, 1973). That paper reports a display that utilizes heat radiation from tungsten. However, the luminous efficiency of the light-emitting portion is very low because, as described above, heat radiation light includes very little visible light. So the display as a whole has a serious problem in efficiency.

In the field of optical communication, in which lasers and LEDs are used as light sources, simpler, lower-cost light sources have been desired. In the field of silicon ICs and LSIs, the realization of optoelectronic integrated circuits have been desired. However, their application range is limited because no silicon device capable of emitting light efficiently is available, and hence an LSI and a light-emitting element need to be manufactured separately. Further, an increase in the integration density of LSIs and multi-layering of complex electric wiring are major factors that prevent a future increase in the integration density of optoelectronic integrated circuits.

As described above, although various attempts have been made to increase the efficiency of light-emitting devices, they have not succeeded in increasing the characteristic to a large extent. Further, complex electrical wiring of LSIs has prevented an increase in the integration density of optoelectronic integrated circuits.

SUMMARY OF THE INVENTION

The present invention has been made in view of the above circumstances in the art, and an object of the present invention is therefore to provide a novel light-emitting device having high luminous efficiency as well as various systems using the novel light-emitting device.

Another object of the present invention is to provide a novel optoelectronic integrated circuit device having optical wiring that replaces complex electric wiring of an LSI.

To attain the above and other objects, the present invention provides the following devices and apparatuses.

One feature of the present invention is that a light-emitting device for radiating visible light includes a light-emitting element configured to radiate first light having an intensity peak within the infrared wavelength region. A photonic crystal structure faces the light-emitting element, and the photonic crystal structure receives the first light from the light-emitting element and transmits the first light to convert the first light into second light having an intensity peak within the visible light wavelength region, and the second light is radiated from the photonic crystal structure as visible light.

A further feature of the present invention is that a light-emitting device for radiating visible light includes a first filament configured to radiate first light having an intensity peak at a first wavelength thereof. A photonic crystal structure is provided surrounding the first filament, and the photonic crystal structure receives the first light from the first filament and transmits the first light to convert the first light into the light having an intensity peak at a second wavelength thereof which is smaller than the first wavelength of the first light, and the second light is radiated from the photonic crystal structure as visible light.

Preferred embodiments of the above present inventions may include the following features (1)–(15).

(1) The photonic crystal structure includes a dielectric layer and metal bodies arranged in the dielectric layer periodically.

(2) Each of the metal bodies is a spherical body.

(3) The dielectric layer is formed of at least one material selected from the group consisting of $TiO_2$, $SiO_2$, $Al_2O_3$, Si, and $ZrO_2$, and the metal bodies are formed of at least one material selected from the group consisting of Ag, Au, Cu, Fe, Co, Ni, W, In, Zn, Cr, Ti, and Pt.

(4) The light-emitting device further includes a defect portion among the metal bodies in the dielectric layer selectively, and the defect portion lacks part of the metal bodies.

(5) The defect portion includes cavities.

(6) The light-emitting device further includes dielectric bodies among the metal bodies in the dielectric layer selectively, and the dielectric bodies are different from the dielectric layer in refractive index.

(7) The photonic crystal structure includes dielectric layers and metal layers stacked alternately with the dielectric layers.

(8) Each of the dielectric layers and each of the metal layers are provided with a one-dimensional periodic structure.

(9) Each of the dielectric layers and each of the metal layers are provided with a two-dimensional periodic structure.

(10) The dielectric layers are formed of at least one material selected from the group consisting of $TiO_2$, $SiO_2$, $Al_2O_3$, Si, and $Zro_2$, and the metal layers are formed of at least one material selected from the group consisting of Ag, Au, Cu, Fe, Co, Ni, W, In, Zn, Cr, Ti, and Pt.

(11) The light-emitting element is formed of at least one material selected from a group consisting of W, Si, SiC, GaN, AlN, graphite, diamond, and amorphous carbon.

(12) The first filament is provided with first holes, and the first holes are arranged periodically along a direction in which the first filament extends and corresponding to the photonic crystal structure.

(13) The first filament crosses a second filament provided with second holes, and the second holes are arranged periodically along a direction in which the second filament extends and corresponding to the photonic crystal structure.

(14) The photonic crystal structure includes a first photonic crystal body having a trench and a second photonic crystal body, and the first and second photonic crystal bodies are combined with each other with the trench interposed therebetween such that the first filament passes through the trench.

(15) The first filament is formed of at least one material selected from the group consisting of W, Si, SiC, GaN, AlN, graphite, diamond, and amorphous carbon.

A further feature of the present invention is that a display apparatus having a light-emitting device for radiating visible light includes a light-emitting element configured to radiate first light having an intensity peak within the infrared wavelength region. A photonic crystal structure is provided facing the light-emitting element, which receives the first light from the light-emitting element and transmits the first light to convert the first light into second light having an intensity peak within the visible light wavelength region, which is radiated from the photonic crystal structure as visible light. A display panel is configured to display information using the second light, and the display panel is irradiated with the second light from the backside thereof.

A further feature of the present invention is that a display apparatus having a light-emitting device for radiating visible light includes a filament configured to radiate first light having an intensity peak at a first wavelength thereof. A photonic crystal structure is provided surrounding the filament, which receives the first light from the filament and transmits the first light to convert the first light into second light having an intensity peak at a second wavelength thereof which is smaller than the first wavelength of the first light, which is radiated from the photonic crystal structure as visible light. A display panel is configured to display information using the second light, and the display panel is irradiated with the second light from the backside thereof.

Preferred embodiments of the above present inventions may include the following features (1)–(3).

(1) The display panel is a liquid crystal display panel.

(2) The display panel includes a plurality of panel portions and the light-emitting element includes a plurality of light-emitting parts, and each of the plurality of light-emitting parts is provided corresponding to each of the plurality of panel portions, and each of the panel portions is colored with a predetermined color so as to display a signal or an image by irradiating the display panel with the second light.

(3) The display panel includes a plurality of panel portions and the first filament includes a plurality of filament parts, and each of the plurality of filament parts is provided corresponding to each of the plurality of panel portions, and each of the panel portions is colored with a predetermined color so as to display a signal or an image by irradiating the display panel with the second light.

Another aspect of the present invention lies in a light-emitting device which radiates light in a desired wavelength range by light emission through heat radiation, light emission with a MIS structure, EL light emission, or fluorescent light emission, wherein a photonic crystal structure is provided so as to occupy at least a portion of a space that is close to a light-emitting portion for radiating light, whereby radiation of light in at least part of the wavelength range other than the desired wavelength range is suppressed or radiation light in at least part of the desired wavelength range is enhanced.

Further, another aspect of the present invention lies in a light-emitting device which radiates light in a desired wavelength range by light emission through heat radiation, light emission with a MIS structure, EL light emission, or fluorescent light emission, wherein a photonic crystal structure is provided so as to occupy at least a portion of a space that is close to a light-emitting portion for radiating light, whereby a polarization state or a radiation pattern of light in the desired wavelength range is controlled.

Further, the present invention provides an illumination apparatus or a display apparatus including the above-described light-emitting devices that are arranged in an array form.

The present invention provides an illumination apparatus or a display apparatus including light-emitting devices that are arranged in an array form, wherein a laser or a light-emitting diode is used as each of the light-emitting devices rather than light radiation by light emission through heat radiation, light emission with a MIS structure, EL light emission, or fluorescent light emission.

Further, the present invention provides an optoelectronic integrated circuit device including a silicon IC and the above-described light-emitting devices that are integrated with the silicon IC. An output signal of the silicon IC is input to a light emitting element (or a filament) of the light-emitting device to cause the light emitting element (or the filament) to radiate light.

Still further, the present invention provides an optoelectronic integrated circuit device including a silicon IC circuit device and a light-emitting body utilizing heat radiation, and at least one of an optical modulator having a photonic crystal structure, an optical waveguide having a photonic crystal structure, an optical filter having a photonic crystal structure, and a photodetector having a photonic crystal structure, at least one of the optical modulator, the optical waveguide, the optical filter, and the photodetector being integrated with the silicon IC circuit device.

In the present invention, the photonic crystal structure is provided so as to occupy at least a portion of a space that is close to the light-emitting portion for radiating light, whereby radiation of light in at least part of the wavelength range other than a desired wavelength range is suppressed or radiation light in at least part of the desired wavelength range is enhanced. For example, a visible wavelength range can be set as the desired wavelength range and radiation of infrared light can be suppressed.

The light emission spectrum of the conventional heat radiation is represented by the black body radiation spectrum that is determined by Planck's equation multiplied by emissivity that is specific to a radiation material. When the temperature of the light-emitting portion is about 2,000° C., visible light accounts for only a small part of the spectrum. The term "photonic crystal structure" as used herein means an artificial crystal that is given optical anisotropy or dispersion by forming an optical band by arranging two or more kinds of media periodically or at different pitches or that is prohibited from propagating light in a particular wavelength range by generating a band gap. The crystal structure may be of one-dimensional, two-dimensional, or three-dimensional.

The concept of the photonic band gap has been proposed in a paper by E. Yablonovitch, Phys. Rev. Lett., 58, p. 2,059, 1987. When disposed close to the above-mentioned light-emitting portion, the photonic crystal can prevent the light-emitting portion from radiating light in a particular wavelength range. For example, if the optical band gap is set in an infrared range, radiation of infrared light can be suppressed and the proportion of visible light can be increased.

According to another aspect of the present invention, the photonic crystal structure is provided so as to occupy at least a portion of a space that is close to the light-emitting portion for radiating light, whereby a polarization state or a radiation pattern of light in a desired wavelength range is controlled. In this case, actually usable light of radiation light in the desirable wavelength range is enhanced, whereby the effective luminous efficiency can be increased.

The above description relates to the case in which the present invention is directed to enhancement of visible light. Similarly, it is possible to make a setting so that near infrared light that is used for the optical communication, particularly light in the vicinity of 1,300 nm or 1,550 nm can be emitted efficiently.

Another feature of the present invention is that the photonic band structure includes at least a metal. In that case, the optical band gap can be particularly widened, whereby the light emission spectrum can be controlled over a wide wavelength range from visible light to far infrared light. That makes it possible to realize more efficient light sources.

Further, the present invention makes it possible to realize an illumination apparatus and a display apparatus that are not only highly efficient, but also high in illuminance by arranging such highly efficient light-emitting devices in an array form. In particular, when a polarization-controlled light source is used as the backlight of a liquid crystal display apparatus, the efficiency can greatly be increased because of the absence of a polarization component that is wasted conventionally.

The present invention makes it possible to easily integrate a silicon LSI with optical elements by forming the light-emitting body portion that causes heat radiation using silicon or tungsten, for example. Further, by combining a light-emitting element that is formed on an LSI and which utilizes heat radiation with, for example, an optical waveguide that utilizes a photonic crystal structure, the present invention makes it possible to replace at least part of conventional electric wiring with optical wiring to simplify wiring, and thereby makes it possible to easily increase the integration density of an optoelectronic LSI.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention will be hereinafter described in detail in the form of illustrated embodiments.

Embodiment 1

Figure 1A:
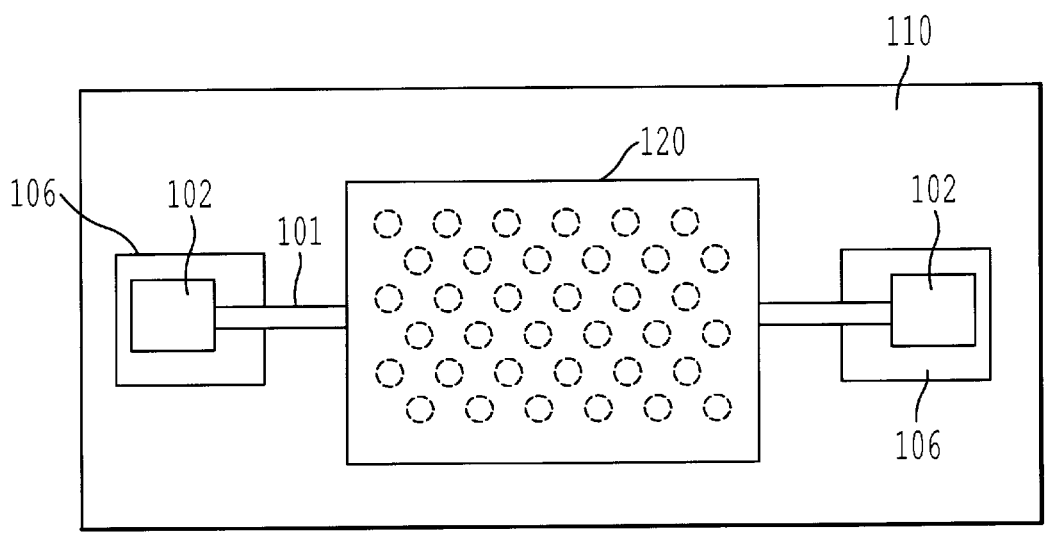
FIGS. 1A and 1B are a plan view and a sectional view, respectively, showing the structure of a light-emitting device according to a first embodiment of the present invention.
Figure 1B:
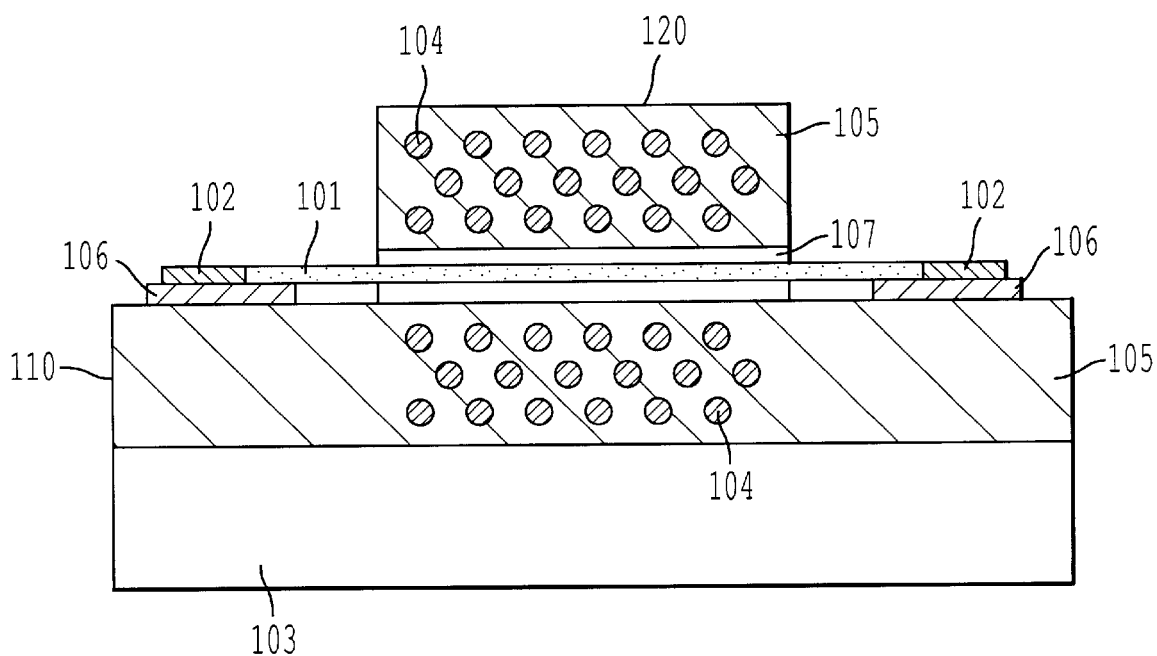

FIGS. 1A and 1B are a plan view and a sectional view, respectively, showing the structure of a light-emitting device according to a first embodiment of the present invention.

In FIGS. 1A and 1B, reference numeral 101 denotes a tungsten filament. The two ends of the filament 101 are connected to respective gold electrodes 102. As described later, the gold electrodes 102 are fixed, via respective $SiO_2$ insulating spacers 106, to a first three-dimensional photonic crystal structure 110, which is composed of Ag (silver) spheres 104 and a $TiO_2$ film 105 and provided on a glass substrate 103. The tungsten filament 101 is suspended in the air by the $SiO_2$ spacers 106.

More specifically, the first three-dimensional photonic crystal structure 110 in which the Ag spheres 104 (which may have a diameter of several nanometers to tens of nanometers) are arranged regularly in the $TiO_2$ film 105 is formed on the glass substrate 103. The two gold electrodes 102 are attached to the first three-dimensional photonic crystal structure 110 via the respective $SiO_2$ spacers 106 so as to be spaced from each other by a prescribed distance. The tungsten filament 101 is disposed between and is connected to the gold electrodes 102.

A second three-dimensional photonic crystal structure 120 that is configured in the same manner as the first three-dimensional photonic crystal structure 110 is formed above the first three-dimensional photonic crystal structure 110 so as to cover a portion of the filament 101 excluding its two end portions. A cavity (groove) 107 is formed on the second three-dimensional photonic crystal structure 120 along a direction in which the filament 101 extends, such that the filament 101 does not directly contact the photonic crystals 110 and 120. As a result, the filament 101 is enclosed by the photonic crystal structures 110 and 120 excluding its two end portions without directly contacting the photonic crystals 110 and 120.

Figure 16:
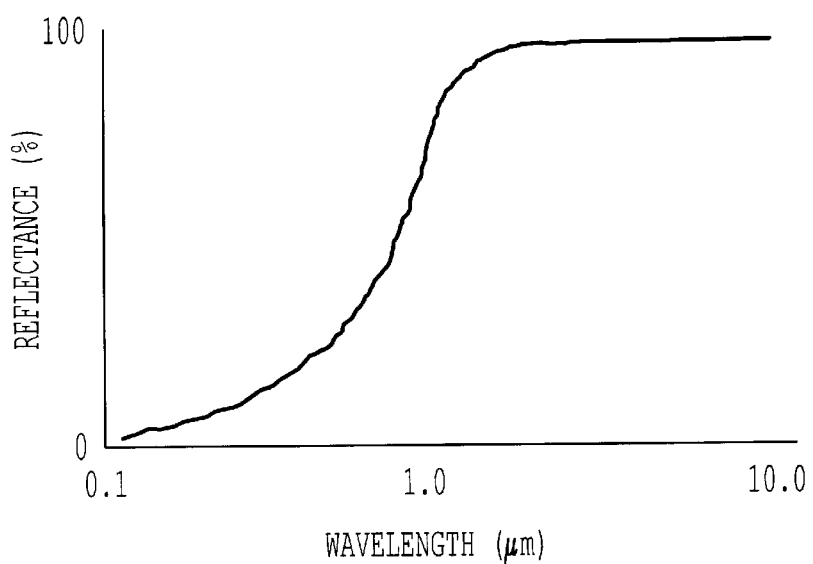
FIG. 16 is a graph showing a reflectance characteristic of the light-emitting devices according to the embodiments of the present invention and indicating an advantage of them.
Figure 17:
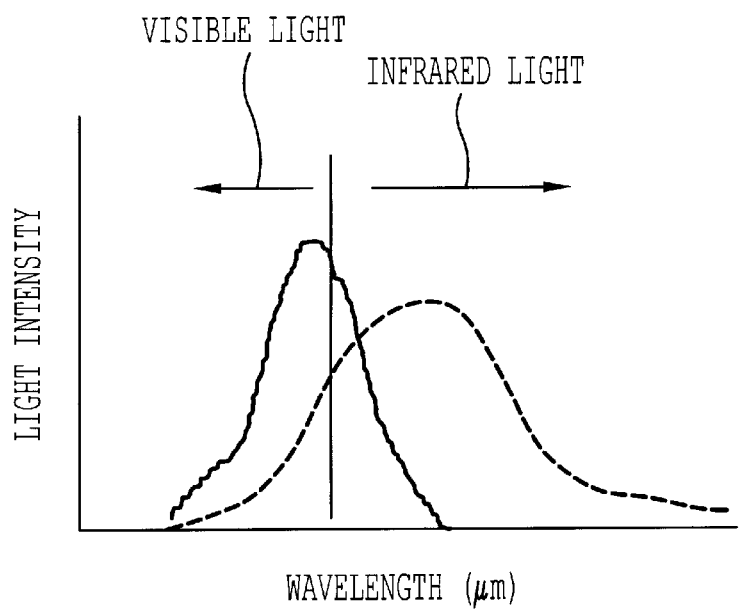
FIG. 17 is a graph showing an emission intensity characteristic of the light-emitting devices according to the embodiments of the present invention and indicating another advantage of them.
Figure 18:
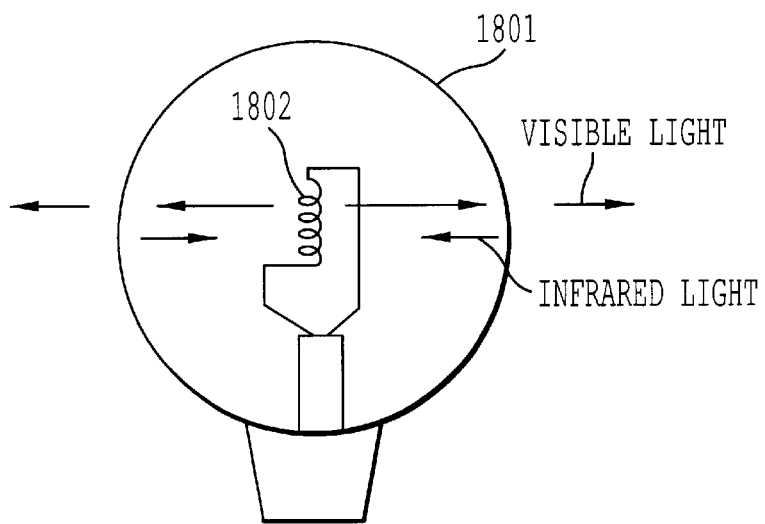
FIG. 18 shows a background illumination incandescent lamp.
Figure 19A:
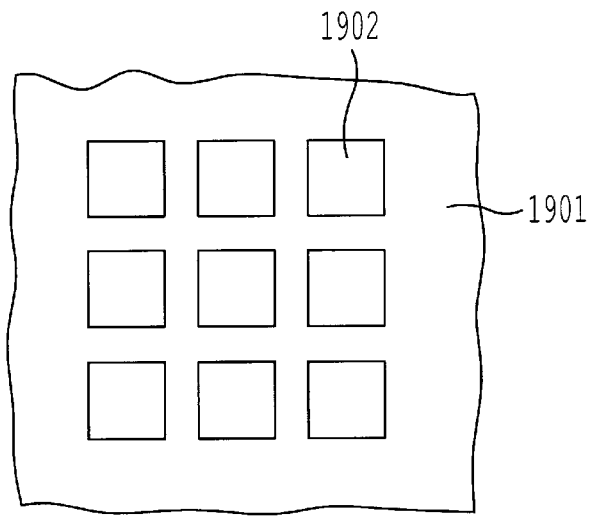
FIGS. 19A and 19B are a plan view and a sectional view, respectively, showing a filament structure of a background light-emitting device.
Figure 19B:
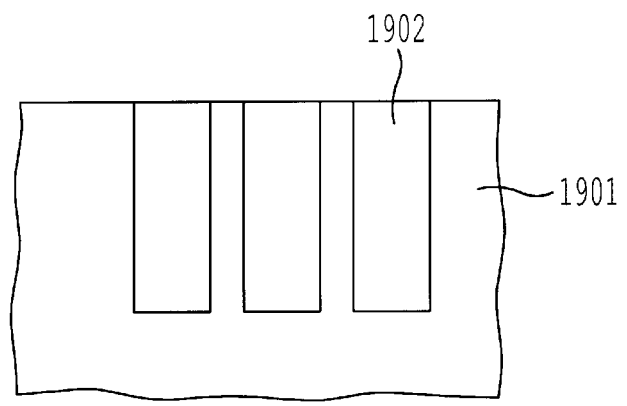

With the above structure, as shown in FIG. 16, the reflectance of the photonic crystal structures 110 and 120 was approximately 100% at a wavelength range of more than 1 µm and approximately 0% in the vicinity of a wavelength of 0.1 µm. Emission spectra were measured by causing a current to flow through the tungsten filament 101. In a sample not having the photonic crystal structures 110 and 120, infrared radiation was dominant as indicated by a broken line in FIG. 17. In contrast, in a sample having the photonic crystals 110 and 120 as in the case of this embodiment of the present invention, infrared radiation was suppressed and the intensity of visible light increased. This is considered due to suppression of infrared radiation from the filament 101 by the photonic crystals 110 and 120. In FIG. 17, the wavelength between the infrared light region and the visible light region radiator is 0.8 µm.

The light-emitting device of this embodiment shows luminous efficiency of 100 lm/W, whereas the luminous efficiency of a conventional light-emitting device with an infrared reflector is 50 lm/W.

Embodiment 2

Figure 2A:
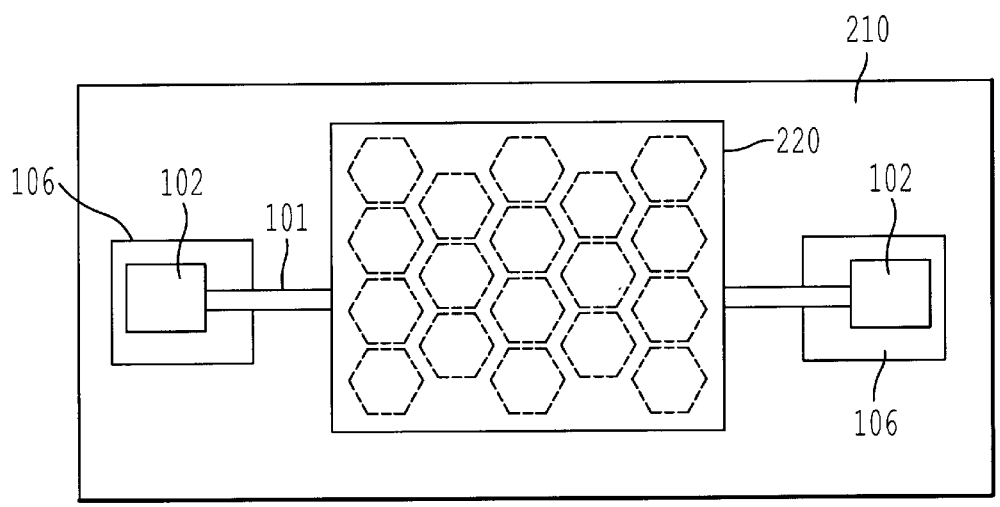
FIGS. 2A and 2B are a plan view and a sectional view, respectively, showing the structure of a light-emitting device according to a second embodiment of the present invention.
Figure 2B:
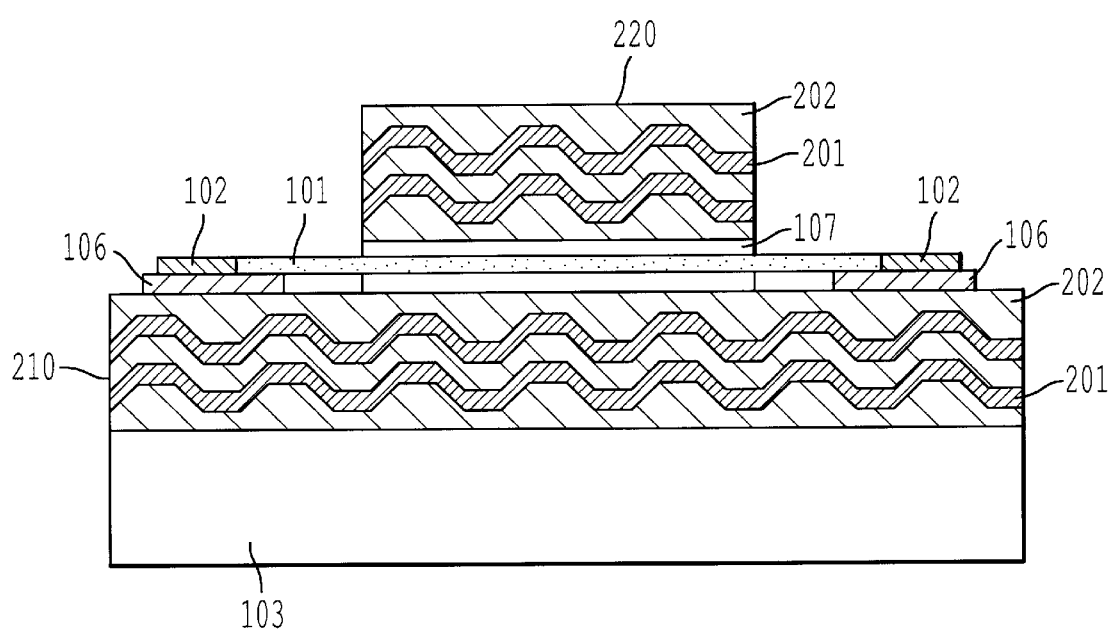

FIGS. 2A and 2B are a plan view and a sectional view, respectively, showing the structure of a light-emitting device according to a second embodiment of the present invention. The parts in FIGS. 2A and 2B corresponding to the parts in FIGS. 1A and 1B are given the same reference numerals as in FIGS. 1A and 1B and are not described in detail.

The second embodiment is different from the first embodiment in the structure of the photonic crystal structures. Specifically, in the second embodiment each photonic crystal structure is formed by laminating thin layers, each of which has a two-dimensionally periodic structure, whereas metal spheres are surrounded by a dielectric in the first embodiment. In FIGS. 2A and 2B, reference numeral 201 denotes Ag films of about 20 nm in thickness; 202 denotes $TiO2$ films of about 20 nm in thickness; 210 denotes a first photonic crystal structure; and 220 denotes a second photonic crystal structure.

The photonic crystal structures 210 and 220 of this embodiment are formed in the following manner. After a relatively thick (thicker than 20 nm) $TiO_2$ film 202 is formed on, for example, a glass substrate 103, hexagonal resist patterns, for example, are arranged on the surface of the $TiO_2$ film 202. By using the hexagonal resist patterns as a mask, the $TiO_2$ film 202 is etched halfway to produce tapers. Then, Ag films 201 and $TiO_2$ films 202 are sequentially deposited by a deposition method that causes a deposited layer to reflect the shape of an underlying layer.

The light-emitting device according to this embodiment provides similar advantages to that according to the first embodiment because the photonic crystal structures 210 and 220 suppress infrared radiation.

Embodiment 3

Figure 3:
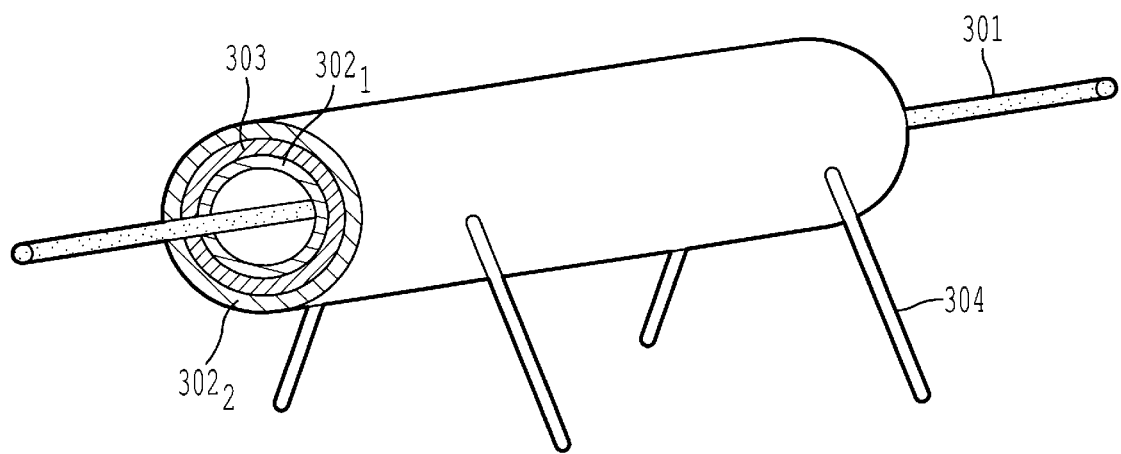
FIG. 3 is a perspective view showing the main part of a light-emitting device according to a third embodiment of the present invention.

FIG. 3 is a perspective view showing the main part of a light-emitting device according to a third embodiment of the present invention.

In FIG. 3, reference numeral 301 denotes a tungsten filament. A cylindrical photonic crystal structure is disposed concentrically with the filament 301. The photonic crystal structure has a three-layer structure in which a $TiO_2$ film $302_1$, of about 20 nm in thickness, an Ag film 303 of about 20 nm in thickness, and a $TiO_2$ film $302_2$, of about 20 nm in thickness are laid one on another. The photonic crystal structure is supported by support rods 304.

The light-emitting device according to this embodiment provides approximately the same advantages as that according to the first embodiment because the photonic crystal structure suppresses infrared radiation.

Embodiment 4

Figure 4A:
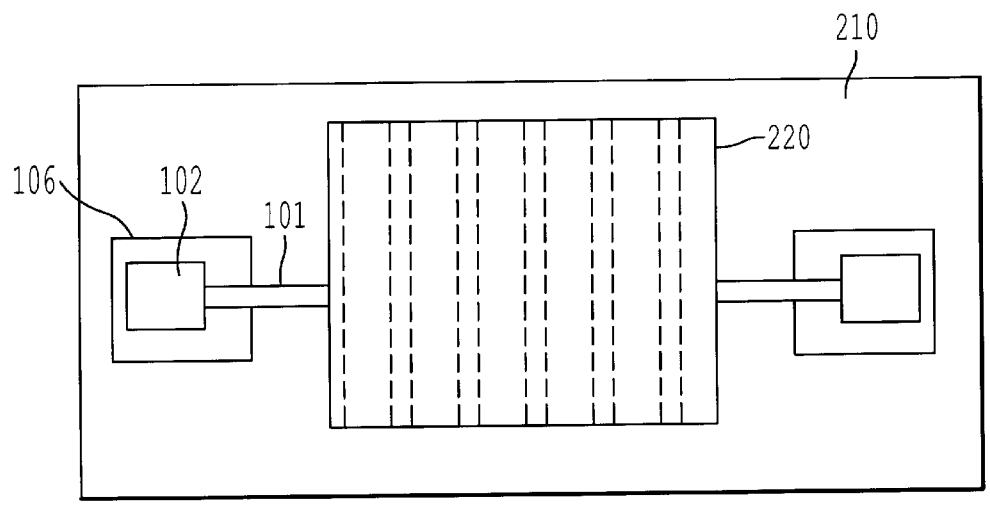
FIGS. 4A and 4B are a plan view and a sectional view, respectively, showing the structure of a light-emitting device according to a fourth embodiment of the present invention.
Figure 4B:
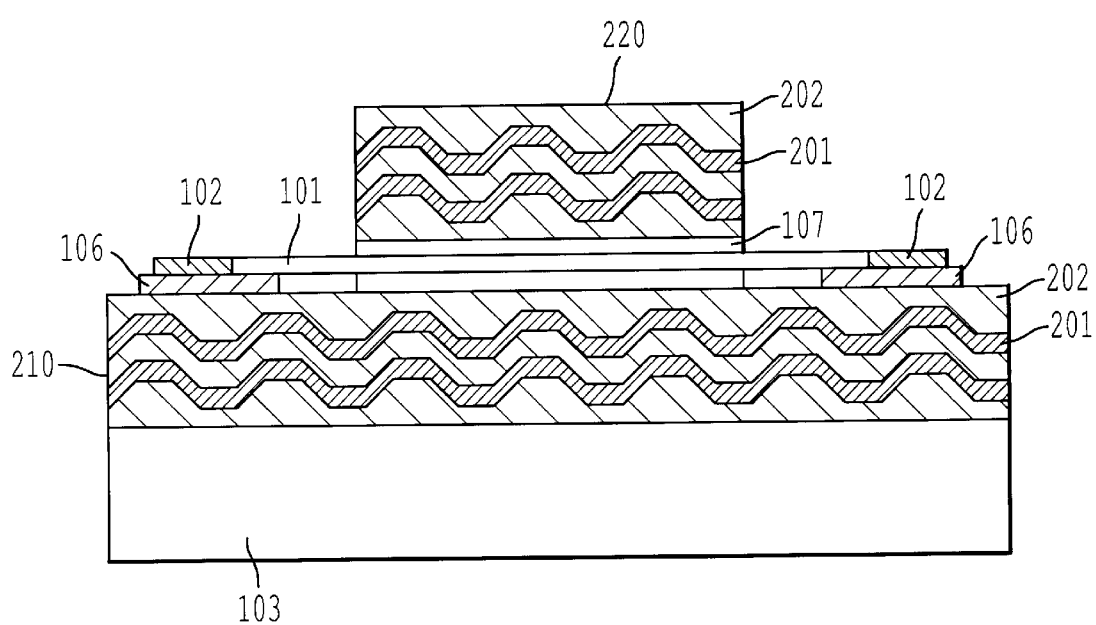

FIGS. 4A and 4B are a plan view and a sectional view, respectively, showing the structure of a light-emitting device according to a fourth embodiment of the present invention. The parts in FIGS. 4A and 4B corresponding to the parts in FIGS. 2A and 2B are given the same reference numerals as in FIGS. 2A and 2B and are not described in detail.

The fourth embodiment is different from the second embodiment in the structure of the photonic crystal structures. That is, in the fourth embodiment each of the photonic crystal structures is one-dimensionally periodic, whereas each of the photonic crystal structures is two-dimensionally periodic in the second embodiment.

The light-emitting device according to this embodiment not only provides similar advantages to that according to the second embodiment, but also can efficiently generate light that is polarized in one direction though emitting light comes through heat radiation.

Embodiment 5

Figure 5A:
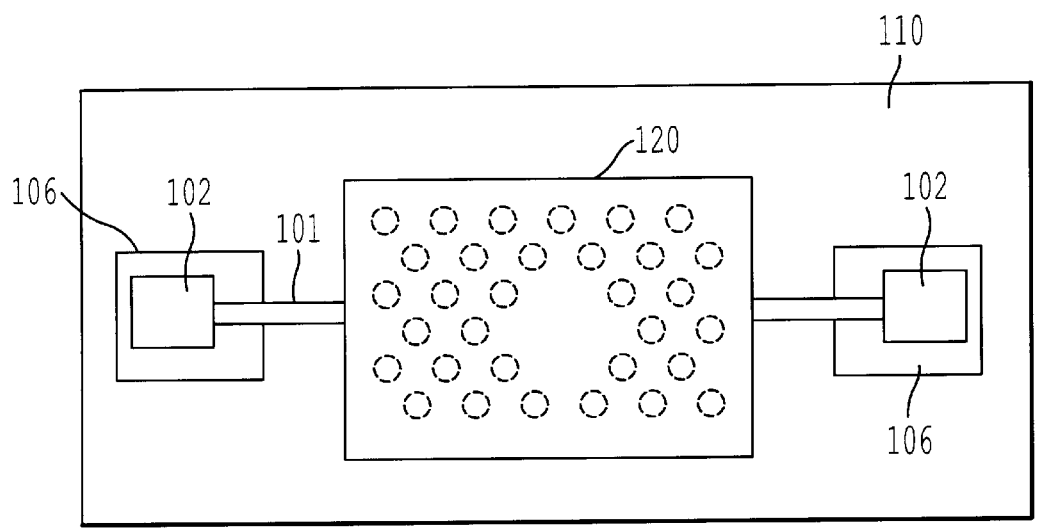
FIGS. 5A and 5B are a plan view and a sectional view, respectively, showing the structure of a light-emitting device according to a fifth embodiment of the present invention.
Figure 5B:
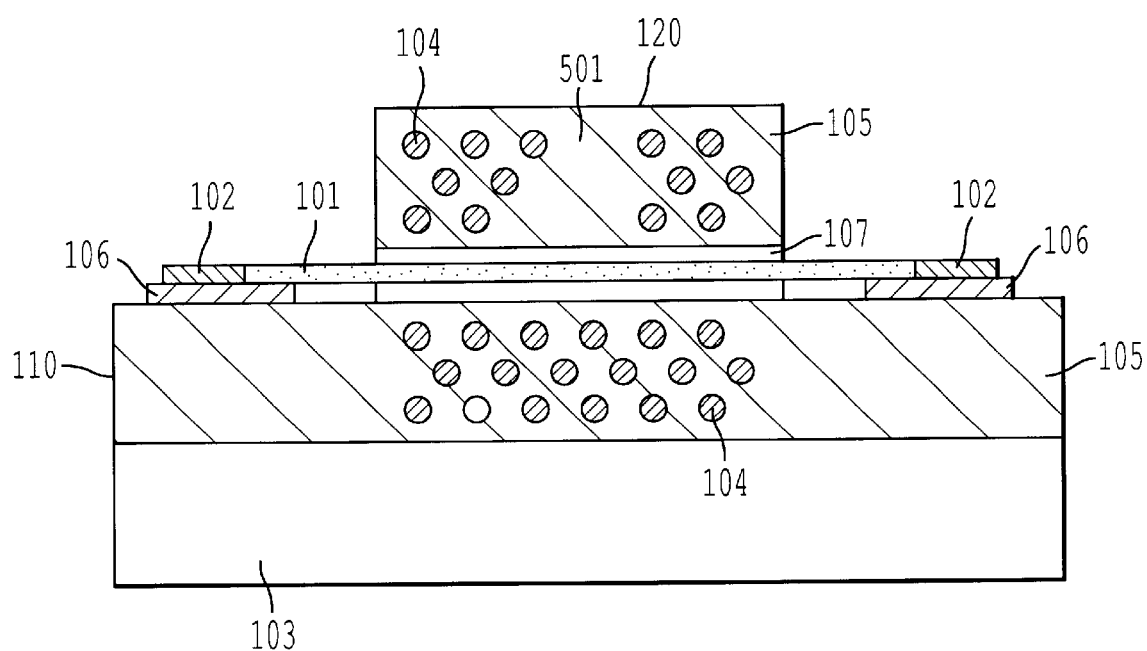

FIGS. 5A and 5B are a plan view and a sectional view, respectively, showing the structure of a light-emitting device according to a fifth embodiment of the present invention. The parts in FIGS. 5A and 5B corresponding to the parts in FIGS. 1A and 1B are given the same reference numerals as in FIGS. 1A and 1B and are not described in detail.

The fifth embodiment is different from the first embodiment in the structure of the photonic crystal structures. That is, in the fifth embodiment, the upper photonic crystal structure 120 has what is referred to as a defect portion 501 where no metal spheres (Ag spheres) exist.

The light-emitting apparatus according to this embodiment not only provides similar advantages to that according to the first embodiment, but also can allow efficient extraction of light from the defect portion 501 because light is concentrated in the defect portion 501. A light beam having superior directivity was emitted upward from the device.

Embodiment 6

Figure 6:
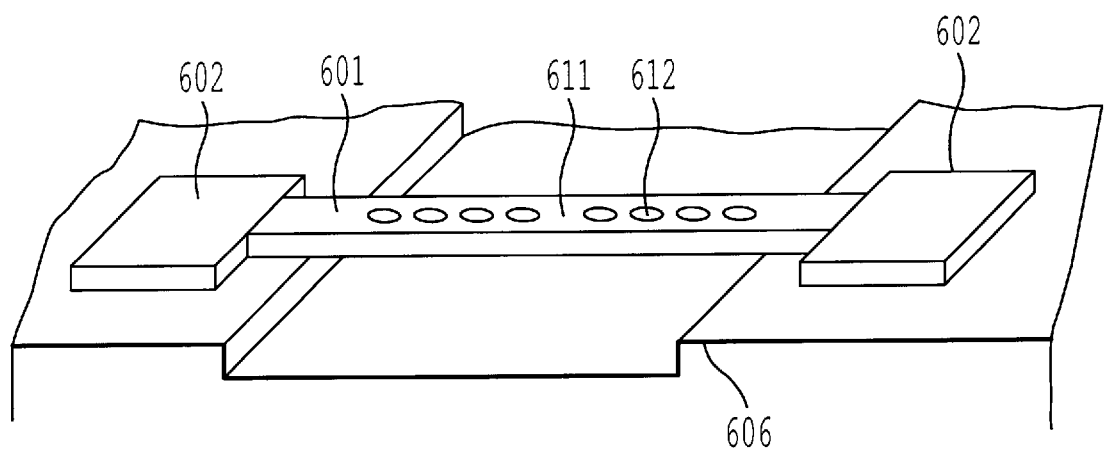
FIG. 6 is a perspective view showing the structure of a light-emitting device according to a sixth embodiment of the present invention.

FIG. 6 is a perspective view showing the structure of a light-emitting device according to a sixth embodiment of the present invention.

In FIG. 6, reference numeral 606 denotes an $SiO_2$ film. An Si filament 601 bridges two portions of the $SiO_2$ film 606. That is, two electrodes 602 are formed on the $SiO_2$ film 606 so as to be separated from each other by a prescribed distance, and the filament 601 connects the electrodes 602. A central portion of the filament 601 is a light-emitting portion 611. Holes 612 that are arranged periodically penetrate the filament 601 excluding the light-emitting portion 611.

In this embodiment, the periodically arranged holes 612 serve as a one-dimensional photonic crystal structure, whereby far infrared radiation from the filament 601 is suppressed and visible light can be emitted with high efficiency.

Embodiment 7

Figure 7:
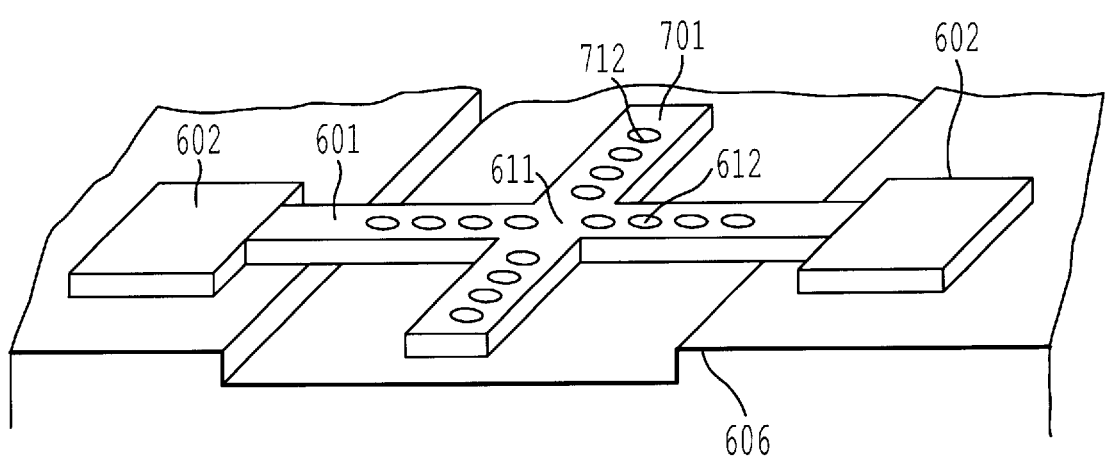
FIG. 7 is a perspective view showing the structure of a light-emitting device according to a seventh embodiment of the present invention.

FIG. 7 is a perspective view showing the structure of a light-emitting device according to a seventh embodiment of the present invention. The parts in FIG. 7 corresponding to the parts in FIG. 6 are given the same reference numerals as in FIG. 6 and are not described in detail.

The seventh embodiment is different from the sixth embodiment in that a photonic crystal structure including an Si filament 701 and holes 712 is also provided in the direction perpendicular to the filament 601. To produce an optical defect, the holes 712 that are provided in the filament 701 are so arranged so that the phases on both sides of the light-emitting portion are deviated from each other.

In this embodiment, because of the presence of the filament 701, wave fronts of an emitted light beam are close to concentric circles, whereby visible light emission that is more efficient than in the sixth embodiment can be attained.

Embodiment 8

Figure 8:
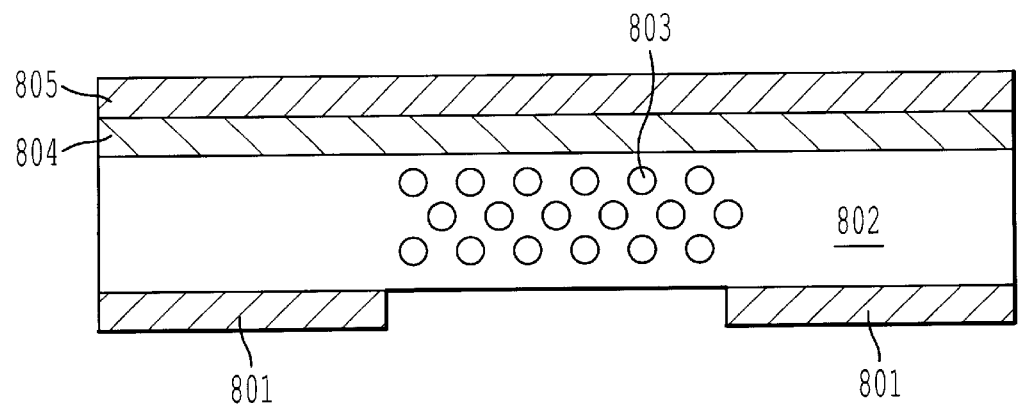
FIG. 8 is a sectional view showing the structure of a light-emitting device according to an eighth embodiment of the present invention.

FIG. 8 is a sectional view showing the structure of a light-emitting device according to an eighth embodiment of the present invention.

The light-emitting device according to the eighth embodiment is an MIS-type one. A metal electrode 805 is formed on an SiC crystal 802 with an insulating layer 804 interposed therebetween. Metal electrodes 801 are formed on the back surface of the SiC crystal 802 so as to be spaced from each other by a prescribed distance. Cavities 803 are formed in the SiC crystal 802 between the two metal electrodes 801 so as to be arranged regularly, whereby a photonic crystal structure is formed.

In this embodiment, efficient blue light emission can be attained.

Embodiment 9

Figure 9:
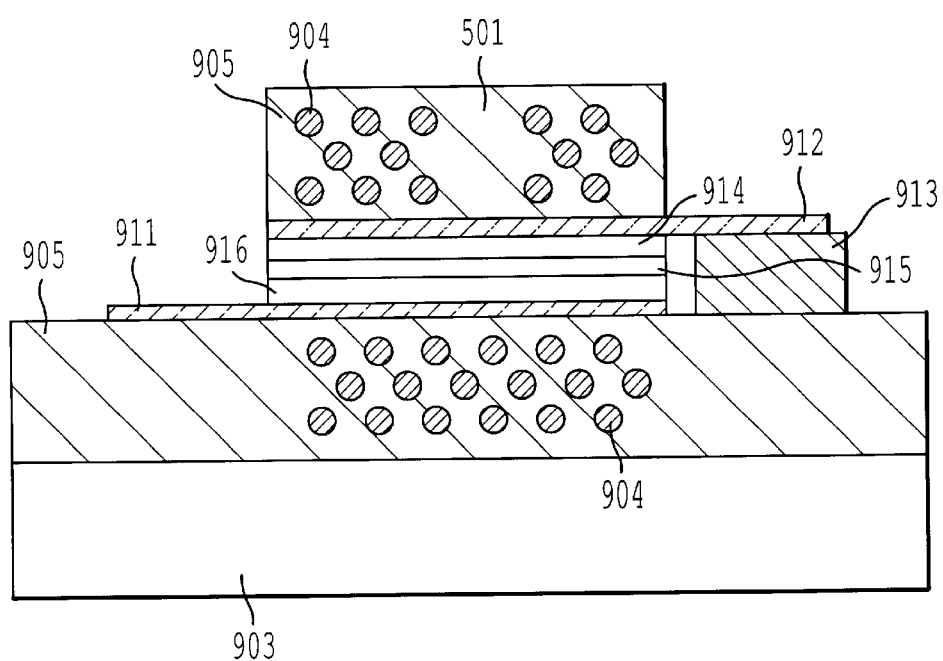
FIG. 9 is a sectional view showing the structure of a light-emitting device according to a ninth embodiment of the present invention.

FIG. 9 is a sectional view showing the structure of an organic EL light-emitting device according to a ninth embodiment of the present invention.

In FIG. 9, reference numeral 915 denotes a light-emitting layer, which is interposed between an electron transport layer 914 and a hole transport layer 916. A transparent electrode 912 is formed on the top surface of the electron transport layer 914, and part of the transparent electrode 912 is extended and fixed to an electrode support stage 913. A transparent electrode 911 is formed on the bottom surface of the hole transport layer 916, that is, on a substrate.

A first photonic crystal structure in which $TiO_2$ spheres 904 are arranged regularly in an $SiO_2$ film 905 is formed on a glass substrate 903. The electrode 911 and the electrode support stage 913 are provided on the first photonic crystal structure. A second photonic crystal structure that is configured in the same manner as the first photonic crystal structure is formed above the first photonic crystal structure so as to cover the EL light-emitting portion. To produce an optical defect, the second photonic crystal structure is provided with a defect portion 501 where no $TiO_2$ spheres 904 exist, in the same manner as in the fifth embodiment.

In this embodiment, by virtue of the addition of the photonic crystal structures, efficient blue light emission with high directivity can be attained.

Embodiment 10

Figure 10:
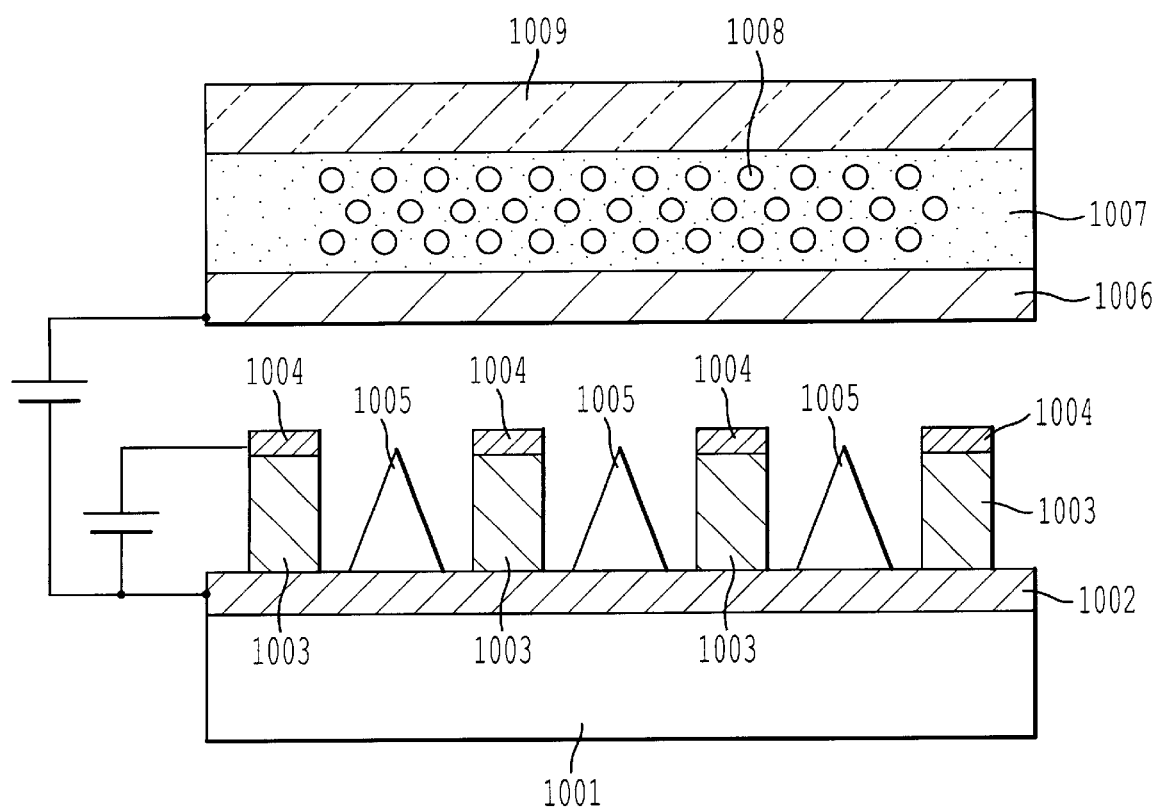
FIG. 10 is a sectional view showing the structure of a light-emitting device according to a tenth embodiment of the present invention.

FIG. 10 is a sectional view showing the structure of a field-emission fluorescent light-emitting device according to a tenth embodiment of the present invention.

In FIG. 10, reference numeral 1001 denotes a substrate. A cathode electrode 1002 is formed on the substrate 1001 and emitters 1005 are arranged on the cathode electrode 1002 in array form. Insulating layers 1003 are formed on the cathode electrode 1002 between the emitters 1005. Gate electrodes 1004 are formed on the respective insulating layers 1003.

On the other hand, a counter substrate that is opposed to the above array substrate is configured as follows. A photonic crystal structure in which spherical cavities 1008 are regularly arranged in a fluorescent material 1007 is formed on a glass substrate 1009. An aluminum thin film 1006 is formed on the photonic crystal structure. The aluminum thin film 1006 is opposed to the array substrate.

In this embodiment, efficient fluorescent light emission can be attained because of a photonic band effect that is caused by the cavities.

Embodiment 11

Figure 11:
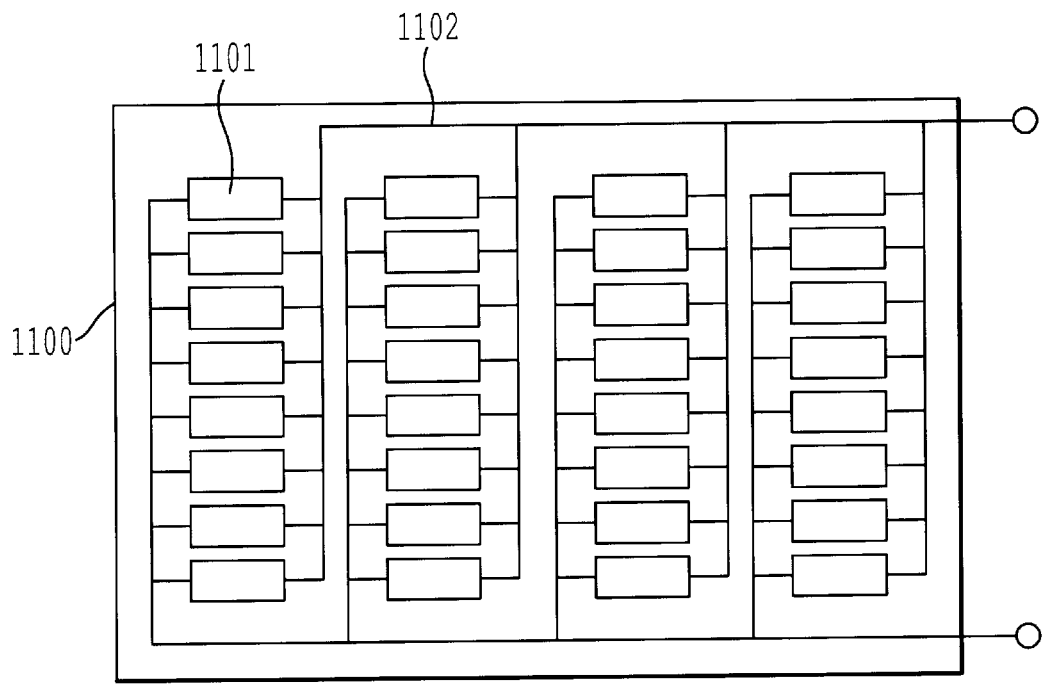
FIG. 11 is a plan view showing the configuration of an illumination apparatus according to an eleventh embodiment of the present invention.

FIG. 11 is a plan view showing the configuration of an illumination apparatus according to an eleventh embodiment of the present invention.

In FIG. 11, reference numeral 1101 denotes the light-emitting devices according to the first embodiment, which are arranged on a substrate 1100 in array form. The light-emitting devices 1101 are connected to each other in parallel via electric wiring 1102. It is also possible to use any of the light-emitting devices according to any of the above-described embodiments, such as the second, fourth, and fifth embodiments, for example.

In this embodiment, because of an increase in the efficiency of each light-emitting device 1101, highly efficient light emission can be attained also as the illumination apparatus.

Embodiment 12

Figure 12:
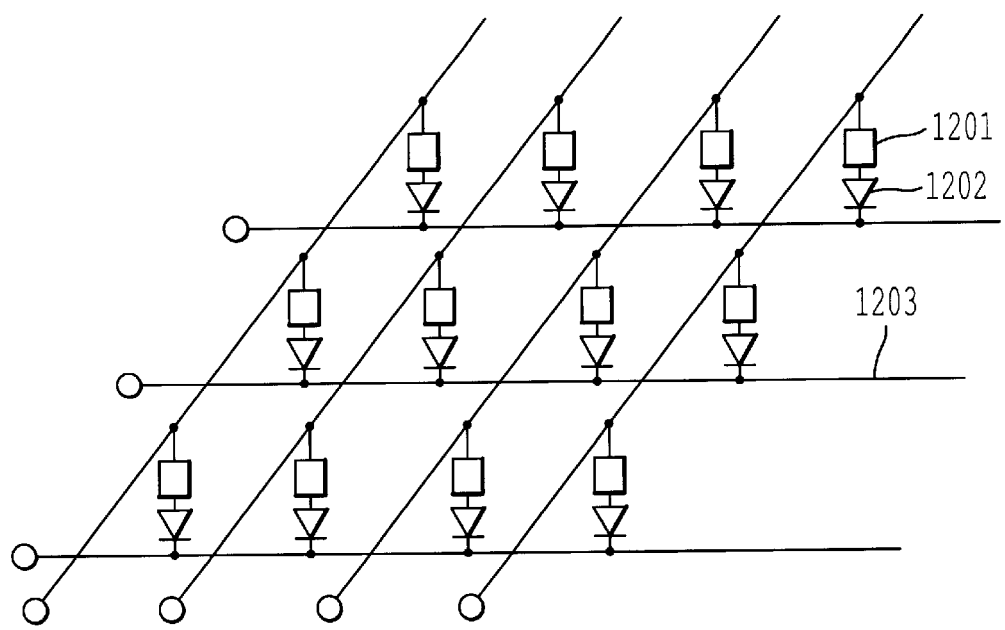
FIG. 12 is a circuit diagram of a display apparatus according to a twelfth embodiment of the present invention.

FIG. 12 is a circuit diagram showing the configuration of a display apparatus according to a twelfth embodiment of the present invention.

By changing the circuit configuration of the array-like illumination apparatus according to the eleventh embodiment to the one shown in FIG. 12, the individual light-emitting devices can be driven selectively, whereby a highly efficient display can be realized. In FIG. 12, reference numeral 1201 denotes the light-emitting devices, numeral 1202 denotes diodes, and numeral 1203 denotes electric wiring.

In the eleventh or twelfth embodiment, the display panel may include a plurality of panel portions, and the light-emitting element may include a plurality of light-emitting parts. Each of the plurality of light-emitting parts is provided corresponding to each of the plurality of panel portions, and each of the panel portions may be colored with a predetermined color so as to display a signal or an image by irradiating the display panel with the light radiated as described in the above embodiments.

Embodiment 13

Figure 13:
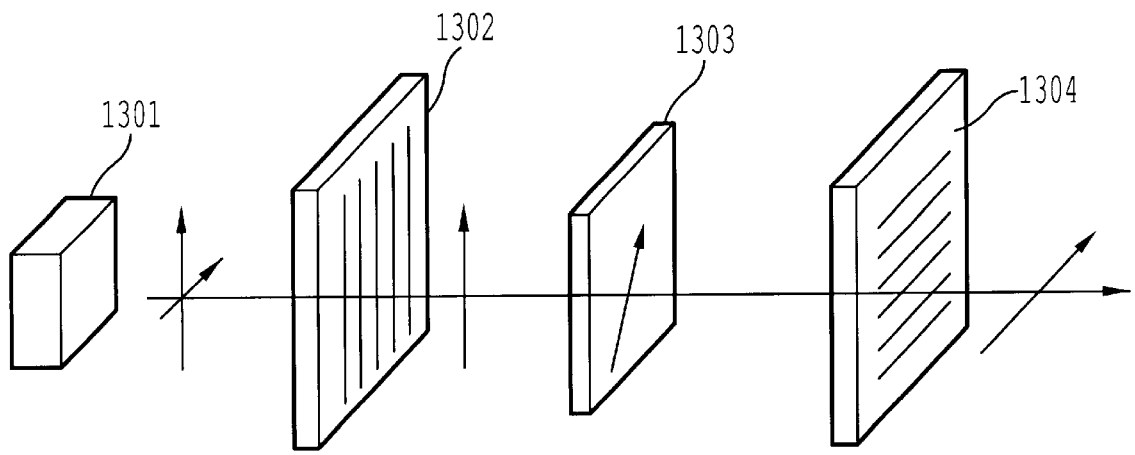
FIG. 13 is a schematic diagram showing the operation of a display apparatus according to a thirteenth embodiment of the present invention.

FIG. 13 is a schematic diagram showing the operation of a display apparatus according to a thirteenth embodiment of the present invention.

In a liquid crystal display having a backlight, light emitted from a light-emitting device 1301 is applied to a polarizer 1302, whereby only light having predetermined polarization reaches a liquid crystal panel 1303. Light whose polarization is changed in the liquid crystal panel 1303 passes through a second polarizer 1304 and produces a light-emitting point.

One half of the light emitted from the light-emitting device 1301 is cut by the first polarizer 1302. Usually, it is necessary to polarize the light by using a complex optical system. In contrast, by using, as the light-emitting device 1301, the light-emitting device according to, for example, the fourth embodiment, polarized light can be obtained when it is emitted from the light-emitting device 130. Therefore, it is not necessary to use a complex optical system for polarizing the light and a highly efficient display apparatus can be realized at a very low cost.

Embodiment 14

Figure 14:
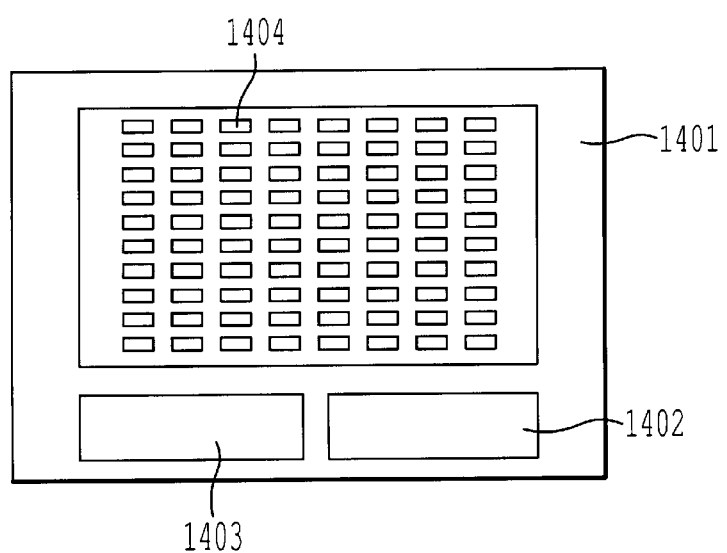
FIG. 14 is a plan view showing the configuration of a display apparatus according to a fourteenth embodiment of the present invention.

FIG. 14 shows the configuration of a display apparatus according to a fourteenth embodiment of the present invention. Reference numeral 1401 denotes an Si substrate. An IC 1402 for data processing, light-emitting elements 1404 that can be driven selectively manner, and an IC 1403 for driving the light-emitting elements 1404 are integrated on the Si substrate 1401.

In this embodiment, the light-emitting devices according to any of the above-described embodiments can be used as the light-emitting elements 1404. In particular, when heat radiation is utilized with an Si or tungsten filament, such light-emitting devices can easily be integrated with a silicon LSI, and hence a display apparatus can be realized at a low cost.

Embodiment 15

Figure 15:
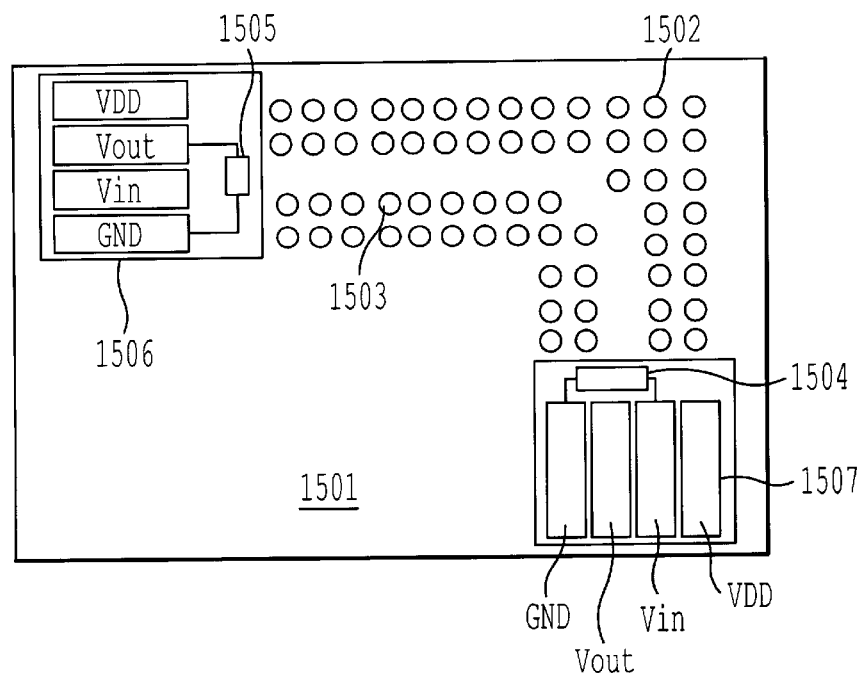
FIG. 15 is a plan view showing a schematic configuration of an optoelectronic integrated circuit according to a fifteenth embodiment of the present invention.

FIG. 15 is a plan view showing the configuration of an optoelectronic integrated circuit according to a fifteenth embodiment of the present invention.

In FIG. 15, reference numeral 1501 denotes an Si substrate; 1504 denotes a photodetector; 1505 denotes a light-emitting element; and 1506 and 1507 denote silicon ICs. Reference numeral 1502 denotes cavities for realizing a photonic crystal structure, and numeral 1503 denotes a portion where an optical defect is formed and which serves as an optical waveguide.

With the above configuration, when the input section of the IC 1506 receives an input, a voltage is generated in the output section of the IC 1506. The light-emitting element 1505 that is connected to the output section emits light, which goes through the optical waveguide 1503 and is input to the IC 1507 on the receiving side. Since a waveguide structure is employed that utilizes the photonic crystal structure, light can be guided without loss even if the optical waveguide 1503 is bent to form a small angle. The IC 1507 on the receiving side receives, with the photodetector 1504, light that has come through the optical waveguide, whereby an output signal is generated.

In this embodiment, electronic elements and optical elements can easily be integrated and optical wiring can be realized. Also, it is possible to form a three-dimensional integrated circuit, and thus more complex functions can be achieved according to this embodiment.

The present invention is not limited to the above embodiments. The material of a filament for light emission through heat radiation is not limited to W and Si and can be changed properly in accordance with specifications. For example, SiC, GaN, AlN, carbon, and diamond can also be used. The material for realizing a photonic crystal structure can also be changed properly in accordance with specifications.

Other various modifications are possible without departing from the spirit and scope of the present invention.

As described above, according to the present invention, in a light-emitting device which emits light through heat radiation, efficient radiation of light can be attained by providing a photonic band structure in such a manner that it occupies a portion of a space that is close to an object that performs heat radiation. This realizes such a highly efficient light-emitting device. As a result, a light-emitting device or system to be used in an illumination apparatus, a display apparatus, or an optical information processing system can be obtained at a low cost. It becomes possible to easily integrate a silicon LSI and optical elements, to thereby increase the integration density of an optoelectronic LSI. With an additional advantage of high reliability, the present invention is very useful.

What is claimed is:

1. A light-emitting device, comprising:

a first filament configured to radiate first light having an intensity peak at a first wavelength by allowing a current to flow in said first filament; and a photonic crystal structure provided surrounding said first filament, said photonic crystal structure receiving said first light from said first filament and suppressing radiation of said first light to increase an intensity of second light having an intensity peak within the visible light wavelength region, said second light radiated from said photonic crystal structure as visible light, wherein said first filament is provided with first holes, said first holes arranged periodically along a direction in which said first filament extends.

2. A light-emitting device according to claim 1, wherein said first filament crosses a second filament provided with second holes, said second holes arranged periodically along a direction in which said second filament extends.

3. A light-emitting device, comprising:

a first filament configured to radiate first light having an intensity peak at a first wavelength by allowing a current to flow in said first filament; and a photonic crystal structure provided surrounding said first filament, said photonic crystal structure receiving said first light from said first filament and suppressing radiation of said first light to increase an intensity of second light having an intensity peak within the visible light wavelength region, said second light radiated from said photonic crystal structure as visible light, wherein said photonic crystal structure comprises a first photonic crystal body having a trench and a second photonic crystal body, said first and second photonic crystal bodies combined with each other with said trench interposed therebetween such that said first filament passes through said trench.

* * * * *